(12) United States Patent
Trevor et al.

(10) Patent No.: US 9,081,940 B2
(45) Date of Patent: Jul. 14, 2015

(54) METHOD AND SERVICE FOR USER TRANSPARENT CERTIFICATE VERIFICATIONS FOR WEB MASHUPS AND OTHER COMPOSITE APPLICATIONS

(71) Applicant: Intel Corporation, Santa Clara, CA (US)

(72) Inventors: Brian Scott Trevor, Folsom, CA (US); Hong Li, El Dorado Hills, CA (US); Joseph Doolittle, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 13/799,360

(22) Filed: Mar. 13, 2013

(65) Prior Publication Data

US 2014/0283105 A1    Sep. 18, 2014

(51) Int. Cl.
    *G06F 21/00* (2013.01)
    *G06F 21/10* (2013.01)
    *G06F 21/62* (2013.01)

(52) U.S. Cl.
    CPC ............ *G06F 21/10* (2013.01); *G06F 21/6218* (2013.01)

(58) Field of Classification Search
    CPC ........................................ G06F 21/10
    USPC ............................................... 726/27
    See application file for complete search history.

(56) References Cited

U.S. PATENT DOCUMENTS

| | | | |
|---|---|---|---|
| 2002/0173924 A1* | 11/2002 | Lin .................................. | 702/81 |
| 2003/0196121 A1* | 10/2003 | Raley et al. .................... | 713/201 |
| 2005/0108569 A1* | 5/2005 | Bantz et al. .................... | 713/201 |
| 2006/0282883 A1* | 12/2006 | Rosenberg et al. ............... | 726/4 |
| 2007/0179978 A1* | 8/2007 | Lee et al. ................... | 707/104.1 |
| 2008/0046758 A1* | 2/2008 | Cha et al. ....................... | 713/189 |
| 2011/0231665 A1* | 9/2011 | Wiseman ....................... | 713/181 |
| 2012/0227114 A1* | 9/2012 | Okuyama et al. ................ | 726/29 |
| 2013/0061035 A1* | 3/2013 | Hook et al. .................... | 713/150 |
| 2013/0232573 A1* | 9/2013 | Saidi et al. ....................... | 726/22 |

* cited by examiner

*Primary Examiner* — Hadi Armouche
*Assistant Examiner* — Shahriar Zarrineh
(74) *Attorney, Agent, or Firm* — Schwegman Lundberg & Woessner, P.A.

(57) ABSTRACT

Embodiments for providing user transparent certificate verifications for web mashups and other composite applications are generally described herein. In some embodiments, a content buffer is provided for holding content until receiving verification results that allow the content to be presented in a browser user interface. A browser core receives an aggregation of content from a plurality of sources and performing local verification of digital certificates associated with the content received from the plurality of sources. A browser content interface intercepts content associated with verified digital certificates from the browser core to provide content associated with verified digital certificates to the content buffer for holding. An online certification module is arranged to receive untrusted certificates from the browser content interface and to perform verification of the received untrusted certificates using online certification services and/or local certificate store on the client device.

17 Claims, 7 Drawing Sheets

METHOD AND SERVICE FOR USER TRANSPARENT CERTIFICATE VERIFICATIONS FOR WEB MASHUPS AND OTHER COMPOSITE APPLICATIONS

TECHNICAL FIELD

Embodiments described herein pertain in general to transparent certificate validation for composite applications.

BACKGROUND

A web mashup is a web page or web application that uses and combines data, presentation or functionality from two or more sources to create new services. The main characteristics of a mashup are combination, visualization, and aggregation. Users to make existing data more useful, for personal and professional use. Web mashups and other composite applications enable dynamic web contents and enrich user experiences. This is especially the case for mobile users and workers, e.g., sales force, with most of the mobile applications moving to web-based applications to improve information sharing and increase productivity.

While web mashups and other composite applications being an enabler to better user experience, they also bring challenges to user experience due to the security controls. Herein, mashups and composite applications will be referred to as composite applications considering mashups are one type of composition. These challenges arise because composite applications combine multiple existing functions and/or data from different origins into a new application or new web content, and most of the time the source functions and/or data are not necessarily used for their original reason or purpose.

As a security precaution, web browsers perform web server certificate validation. The web browser provides multiple user prompts for the user to decide on whether or not to allow web contents from sites based on the verification results. For example, a user is often prompted with status of digital certificates of multiple sources that produce the result content based on certificate verification results from the browser. This is at a minimum, an annoying user experience, especially for mobile sales workers who use their mobile devices to increase productivity in what they call "micro-moments." During these "micro-moments" mobile sales workers have just a few seconds to look something up, or post something, etc. However, complicated certificate verification or other authentication processes may cause mobile users to abandon the effort.

In addition the certificate verification prompts provided to users are also a security concern to average users. Users may keep clicking on "allow website/content" to go through the process if they want to get the results. In addition to user annoyance and security concerns, it is also a burden for enterprise IT to manage web certificates and push the management controls to the client when exacerbated by the mashups.

DETAILED DESCRIPTION

Composite applications combine multiple existing functions and/or content from different origins into a new application or new web content. As a security precaution, web browsers perform web server certificate validation for the combined content and functions. However, the web browser provides multiple user prompts to the user and waits for the user to decide on whether or not to allow web content from sites based on the verification results. A security issues arises when users continuous click on the "allow website/content" prompt in order to quickly go through the process to allow the content to be presented by the browser. Embodiments described herein provide transparent certificate verifications for web mashups and other composite applications according to an embodiment. The embodiments provide streamline certification verification using a browser plug-in that performs local digital certificate verification or that uses at least one online verification service that is accessed by an online certification module.

Figure 1:
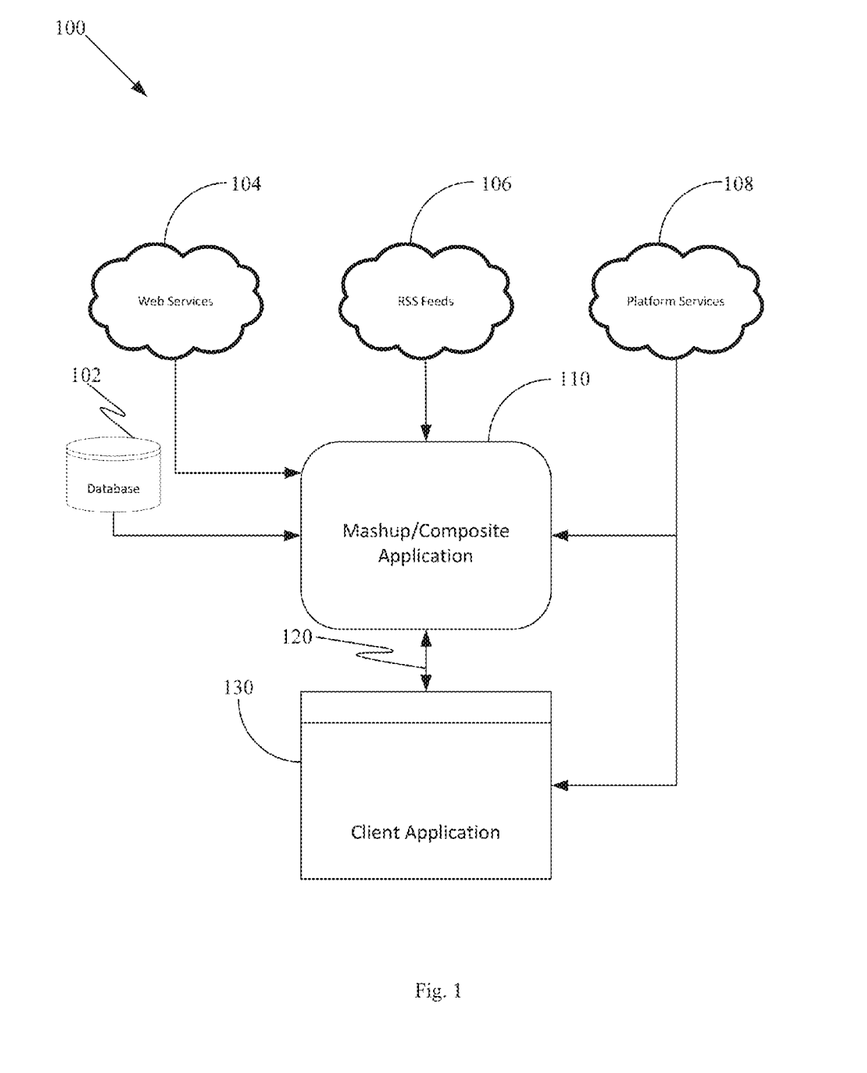
FIG. 1 shows an architectural diagram for a mashup system according to an embodiment.

FIG. 1 shows an architectural diagram for a mashup system 100 according to an embodiment. Although there is great variation in the user interface and the sources of data for many web mashups, they still have common architectural patterns that they share. For example, mashups are RESTful in nature, i.e., they conform to the REpresentational State Transfer (REST) principles. REST is a technique of web-based communication that uses HTTP (hypertext transfer protocol) and extensible markup language (XML) to support a few operations that are applicable to pieces of information, e.g., including the commands Post, Get, Put, Delete, etc.

In FIG. 1, the architectural rendering of a mashup includes several content sources. For example, FIG. 1 shows content being obtained from a database 102, web services 104, RSS (Really Simple Syndication) feeds 106, and platform services 108. The content is aggregated in a mashup application 110 and the aggregated content 120 is presented in a client application 130. Data obtained from web services 104 may be serialized to XML or JavaScript Object Notation (JSON). RSS feeds 106 may be XML documents, and many libraries exist to manipulate RSS feeds 106. The format and specification for RSS is well documented and understood with a few variations from version to version. Further, the extensibility of RSS is also well known, as demonstrated by the number of extensions in use today, e.g., attachments added to the feeds, information and location information, creative commons licensing, etc. Web services 104 may include Web Services Description Language (WSDL)-based web services and REST-based web services, with some web services 104 exposing WSDL and REST styles. Web services 104 provide additional data or transform the data being mashed-up.

Platform services 108 are included in FIG. 1 because they may provide functionality beyond the request/response model of traditional web services, e.g., mapping services, cloud-based building block services such as storage "in the cloud," business communication platform services where communications may be relayed across a corporate firewall to expose internal services for consumption by business partners or third parties. Mashup/composite applications 110 provide a combination of middle-tier services and lightweight business logic that may be used to combine data and/or functionality from more than one source into an integrated tool. Client application 130 is the application that presents the mashup or composite application to the user.

HTTP Secure (HTTPS)-based web sites commonly use security certificates to verify a source of a message or data. A web browser operates as client application 130 and validates that a TLS (Transport Layer Security) web server is authentic. In practice, a web site operator obtains a certificate by applying to a certificate provider with a certificate signing request. The certificate request is an electronic document that contains the web site name, contact email address, and company information. The certificate provider signs the request, thus producing a public certificate. During web browsing, this public certificate is served to any web browser that connects to the web site and proves to the web browser that the provider believes it has issued a certificate to the owner of the web site.

Examples of certificate verification prompts provided by browsers include:

"This website's security certificate has been revoked"
"This website's address does not match the address in the security certificate"
"This website's security certificate is out of date"
"This website's security certificate is not from a trusted source"
"Internet Explorer has found a problem with this website's security certificate"

A certificate verification prompt is followed by a question to the user: "Do you want to continue to display the web content from this website?"

Figure 2:
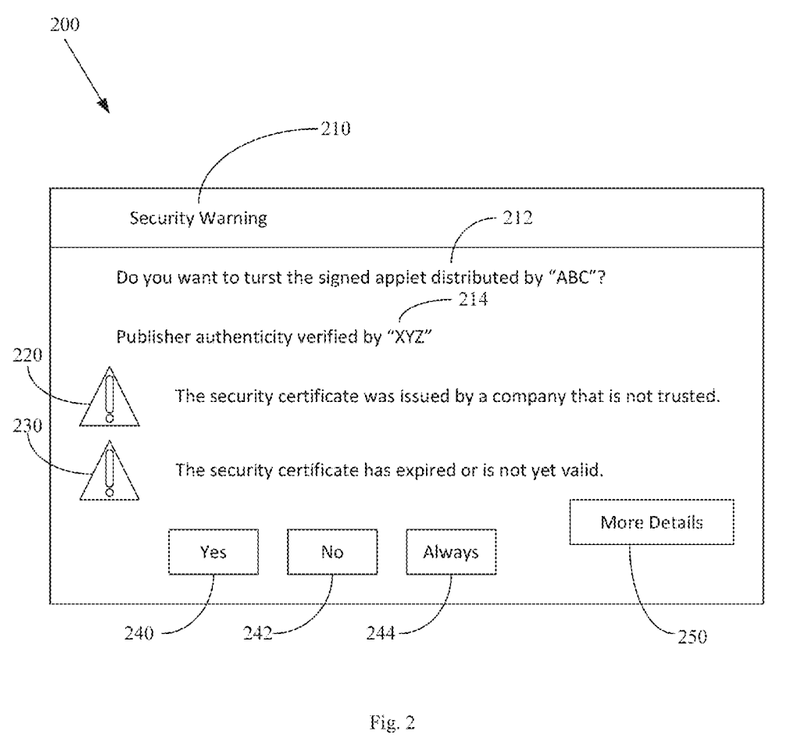
FIG. 2 shows a security warning for an untrusted certificate according to an embodiment.

FIG. 2 shows a security warning 200 for an untrusted certificate according to an embodiment. Security warning 200 is presented in a browser when the browser comes across a website using a digital certificate that does not have its public key stored in the browser. In FIG. 2, security warning 200 includes a title bar 210. Security warning 200 further asks the user whether to trust the certificate from "ABC" and that the certificate from "ABC" has been authenticated 212. Security warning 200 indicates that the authenticity of publisher of the certificate has been verified by "XYZ" 214. Security warning 200 includes two warnings 220, 230. The user has the option of trusting the certificate by selecting "Yes" 240, to reject the certificate by selecting "No" 242 or to always trust the certificate from ABC by selecting "Always" 244. The user may also select "More Details" 250 to obtain additional information regarding the certificate.

Figure 3:
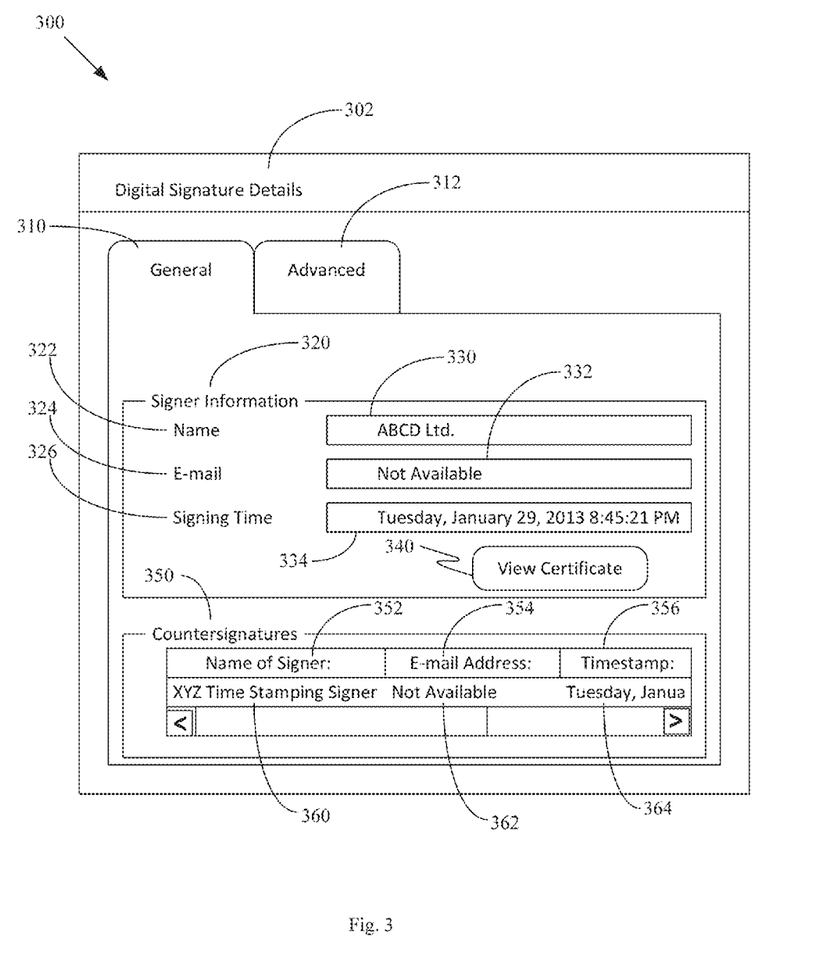
FIG. 3 illustrates details graphical user interface (GUI) associated with a real and valid digital certificate according to an embodiment.

FIG. 3 illustrates details graphical user interface (GUI) 300 associated with a real and valid digital certificate according to an embodiment. In FIG. 3, GUI 300 includes a title bar 302 identifying the window as showing digital signature details. GUI 300 includes a general tab 310 and an advanced tab 312. Details for advanced tab 312 are not shown in FIG. 3. GUI 300 also presents signer information 320. Signer information 320 includes the name 322, e-mail address 324, and signing time 326. Name 322 is shown as "ABCD Ltd." 330, email address 324 is shown as "Not Available" 332, and signing time 326 is shown as "Tuesday, Jan. 29, 2013 8:45:21 PM" 334. The user is further presented with the option of viewing the certificate 340. FIG. 3 further shows countersignatures information 350. Countersignatures information 350 includes the name of the signer 352, the e-mail address of the signer 354, and the time stamp 356. The name of the signer 352 is shown as "XYZ Time Stamping Signer" 360, the e-mail address of the signer 354 is "Not Available" 362, and the time stamp 356 information is partially revealed in FIG. 3 as being "Tuesday, Janua"364. Authenticode certificates carry an expiration date, but timestamp 356 may extend the valid date of the certificate by acting as a countersignature. If no timestamp 356 exists, the expiration date of the certificate itself applies.

Figure 4:
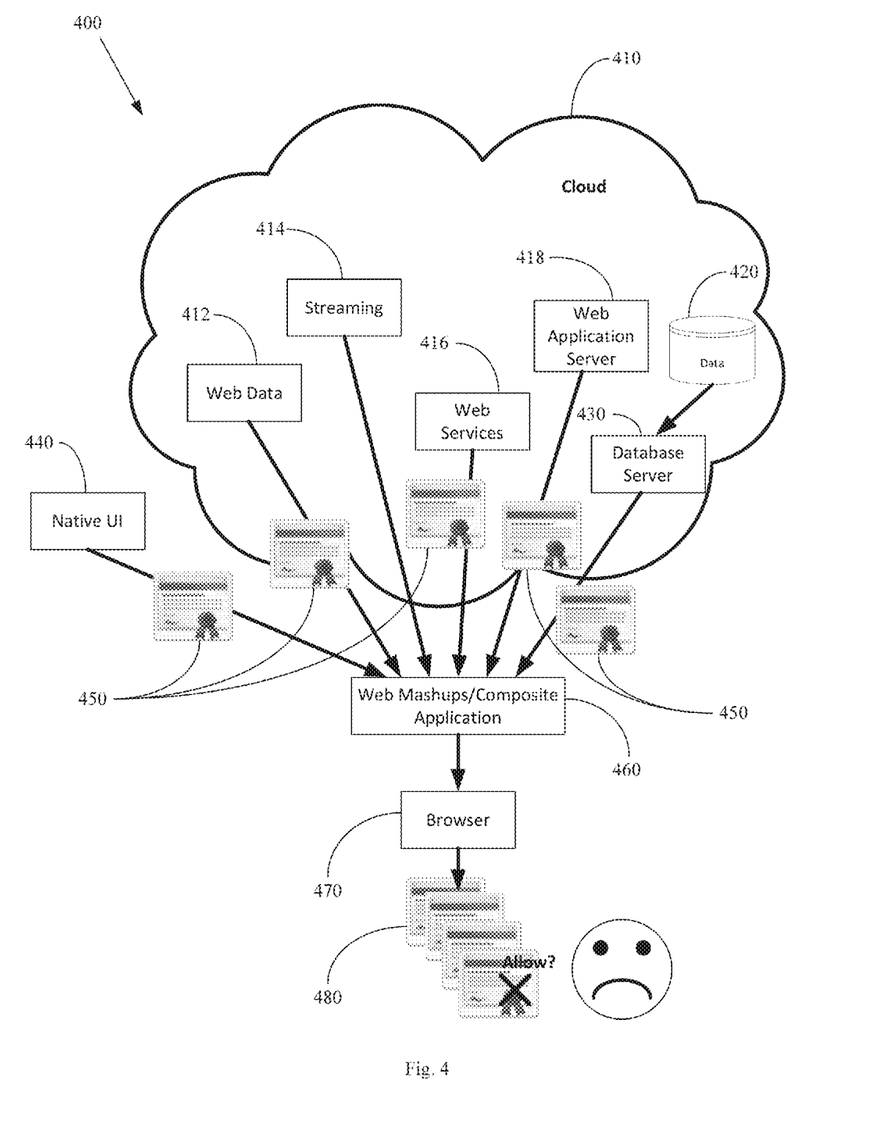
FIG. 4 illustrates a system wherein a mashup/composite application is receiving multiple digital certificates associated with content being delivered to the mashup/composite application according to an embodiment.

FIG. 4 illustrates a system 400 wherein a mashup/composite application 460 is receiving multiple digital certificates 450 associated with content being delivered to the mashup/composite application 460 according to an embodiment. In FIG. 4, several sources of data are shown in a cloud 410. Cloud 410 includes a web data server 412, streaming data server 414, a web services server 416, a web application server 418, and a database 420 passing data through a database server 430. A native user interface (UI) 440 is also shown as a source of data. The data from the native UI 440, the web data server 412, the web services server 416, the web application server 418, and from the database 420 passed through the database server 430 include a digital certificate 450. However, the streaming data from streaming data server 414 does not include a digital certificate.

The user faces several challenges when using a mashup/composite application 460. Because most of the mobile applications are web-based and rely on some type of mashup and/or composite application 460, the user runs into the problem of being prompted multiple times to make decisions on certificate validation status provided by the web browser 470. There are essentially two challenges for the user here. The first challenge involves the unacceptable user experience when presented with multiple digital certificates. The second challenge occurs when the users makes the wrong choices—the user is left with the option to keep clicking on "accept" to make selections regarding the digital certificates 480 presented by the browser 470.

Figure 5:
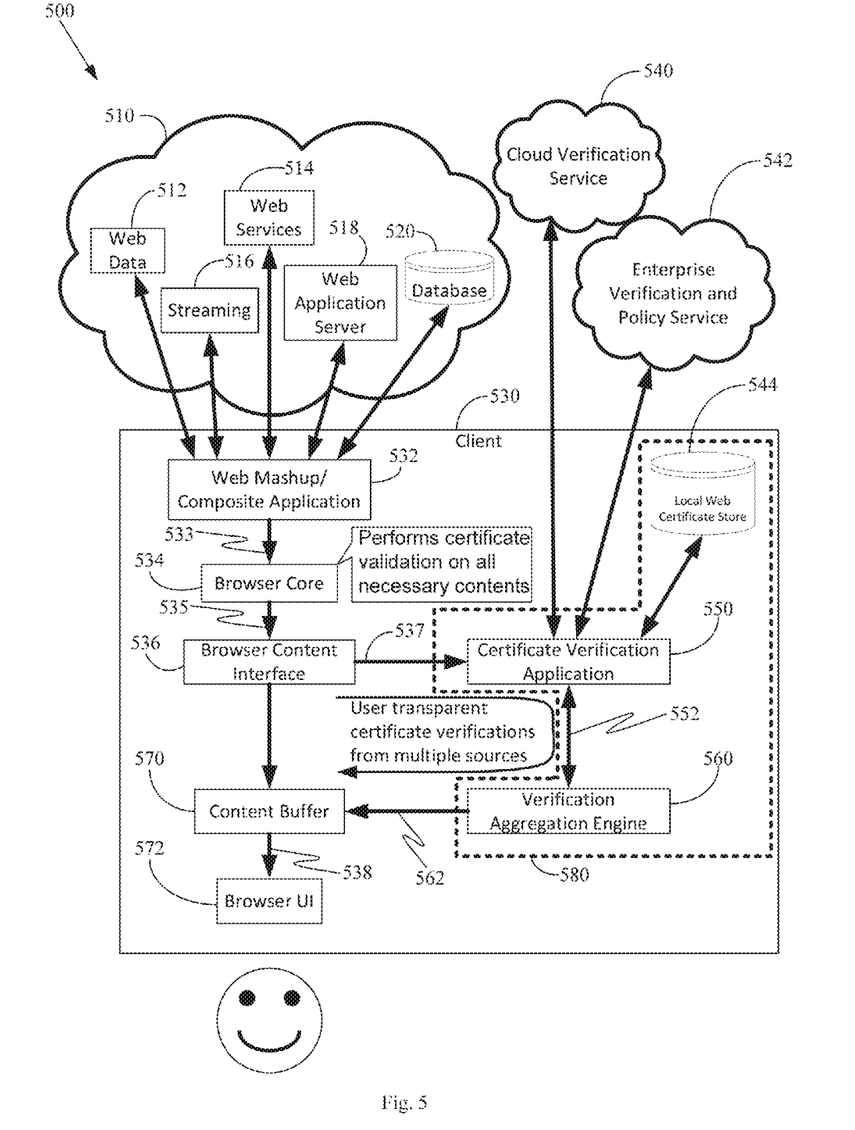
FIG. 5 illustrates a system for providing transparent certificate verifications for web mashups and other composite applications according to an embodiment.

FIG. 5 illustrates a system 500 for providing transparent certificate verifications for web mashups and other composite applications according to an embodiment. The system 500 provides streamline certification verification using a browser plug-in/core 534 that performs local digital certificate verification or that uses at least one online verification service 540, 542 that is accessed by an online certification module 580. The online certification module 580 may also access an enterprise verification and policy service 542 or a cloud verification service provider 540. These verification services are not necessarily the traditional certificate authority (CA) in a public key infrastructure (PKI) system.

FIG. 5 includes a plurality of content sources 512-520 that may be provided in a cloud 510. The cloud 510 may include a web data server 512, streaming data server 516, web services server 514, a web application server 518, and a database/database server 520. The client application 530 receives the data at a web mashup/composite application 532.

The web mashup/composite application 532 aggregates the data from the plurality of data sources into the mashup/composite application contents 533 to be presented to the user. Contents 533 from the web mashup/composite application 532 are provided to the browser core 534. The browser core 534 performs certificate validation on contents using certificates maintained by the browser core 534. After the browser core 534 has performed its certificate validation task, the browser content interface 536 intercepts the contents 535 from the browser core 534 before it reaches the user, puts the contents 535 into the content buffer 570, and sends web certificates with problems 537 to a certificate verification application 550. A cloud verification service 540 is provided to the certificate verification application 550 in the client 530.

The cloud verification service 540 is an external cloud service providing further certificate verification, which may be a CA in a PKI solution. However, the embodiments are not meant to be limited to a cloud CA in a PKI solution.

An enterprise verification and policy service 542 is also coupled to the certificate verification application 550 in the client 530. The enterprise verification and policy service 542 provides further certificate verification and policies. As an example, the enterprise verification and policy service 542 may be an enterprise CA in a PKI solution. However, the embodiments are not meant to be limited to an enterprise CA in a PKI solution. In addition to the role of policy provisioning and verification, the enterprise verification and policy service 542 may also receive updated information from the process via client feedback regarding the status of web certificates to therefore improve the management from an enterprise 117 perspective.

The client 530 may also include a local web certificate store 544 that is coupled to the certificate verification application. The local web certificate store 544 is a local database with historical information with different websites and associated certificate data, along with user policies based on certificate status, e.g., allows certain content from previously visited safe websites with expired certificates. The local web certificate store 544, certificate verification application 550 and verification aggregation engine 560 may collectively be referred to an online certification module 580.

The certificate verification application 550 receives untrusted certificates 537 from the browser content interface 536. The certificate verification application 550 verifies certificates with problems 537 via the local certificate store 544, the enterprise security certificate verification and policy service 542, and/or a cloud security certificate verification service 540 based on properties/problems of the certificates and availability of the services. Note that the certificate verification application 550 is not designed to replace certificate validation by the browser core 534. Rather the certificate verification application 550 receives untrusted certificates 537 and access local web certificate store 544, cloud verification server and/or enterprise verification and policy server to determine whether untrusted certificates detected by the browser core may be verified to allow content associated with untrusted certificates to be released from the content buffer 570.

A verification aggregation engine 560 aggregates the verification results 552 provided by the certificate verification application 550 after verification of the untrusted certificates 537 is performed by certificate verification application 550. The verification aggregation engine 560 then sends the aggregated verification results 562 to the content buffer 570. In the meantime, the verification aggregation engine 560 may send feedback to the enterprise verification and policy service 542 based on the aggregation and analysis. The content buffer 570 temporarily holds the web content 538, releases and/or blocks content 538 to the browser UI 572 based on the verification results 562 from the verification aggregation engine 560.

Accordingly, the untrusted certificates 537 received from the browser content interface 536 by the certificate verification application 550 are transparently verified by the certificate verification application 550 using certification information from multiple sources 540, 542, 544. The verification process of multiple digital certificates from different sources in web mashups and other composite applications 532 is also an automated solution so the user does not need to be distracted by monitoring the verification process of the untrusted certificates 537. Reducing user decision making on whether to allow content from untrusted sources 537 until after verifying the certificates with different verification methods and then possibly providing a prompt for those that improve security. The verification aggregation engine 560 may sends updates to the local certificate store 544 based on the verification results of previously unknown or expired certificates. Also, the certification verification application 550 may be implemented as an independent security application, an add-on the Secure Enclave/McAfee DeepSafe™, or as firmware. The transparent verification and automation of the process improves the user experience and assurance level on composite applications. Furthermore, additional data points are provided for enterprise certificate management to better manage certificate status and push updates to enterprise clients.

Figure 6:
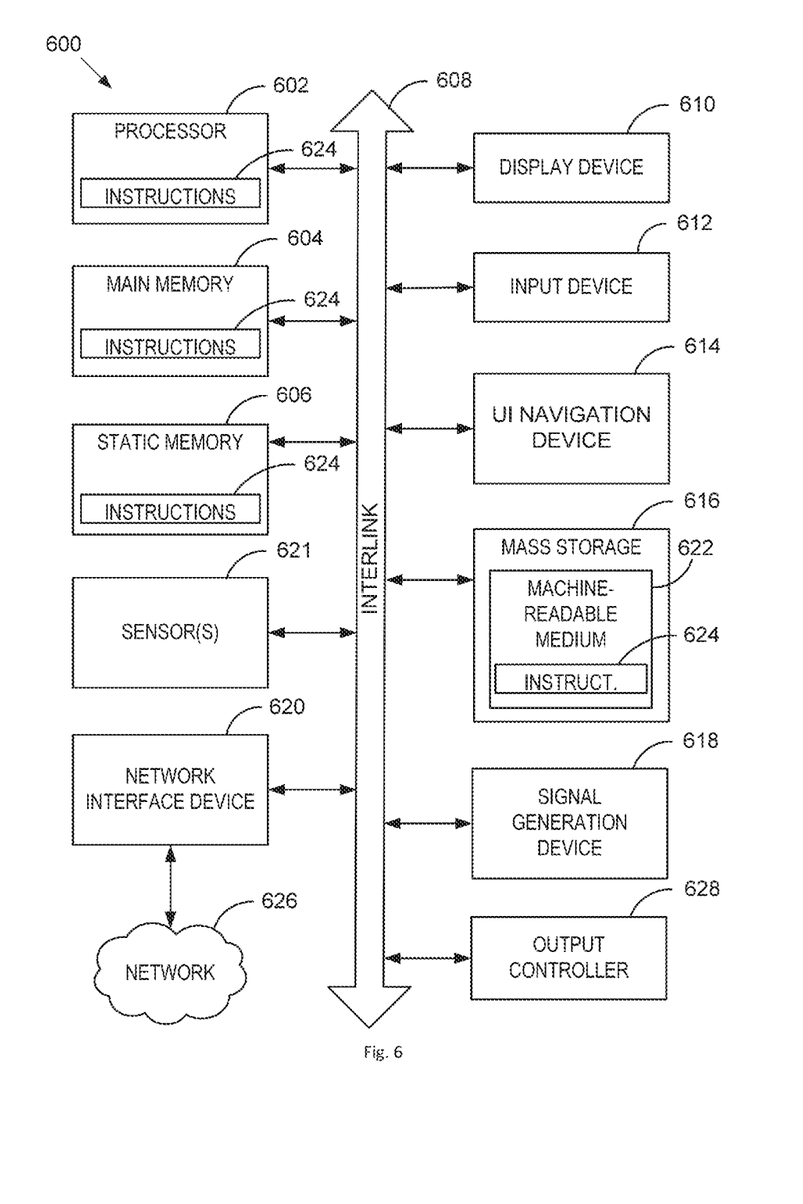
FIG. 6 illustrates a block diagram of a machine for providing user transparent certificate verifications for web mashups and other composite applications according to an embodiment.

FIG. 6 illustrates a block diagram of an example machine 600 for providing user transparent certificate verifications for web mashups and other composite applications according to an embodiment upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine and/or a client machine in server-client network environments. In an example, the machine 600 may act as a peer machine in peer-to-peer (P2P) (or other distributed) network environment. The machine 600 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the at least a part of one or more computer systems (e.g., a standalone, client or server computer system) or one or more hardware processors 602 may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 602 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 600 may include a hardware processor 602 (e.g., a central processing unit (CPU), a graphics processing unit (GPU), a hardware processor core, or any combination thereof), a main memory 604 and a static memory 606, at least some of which may communicate with others via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR)) connection to communicate or control one or more peripheral devices (e.g., a printer, card reader, etc.).

The storage device 616 may include at least one machine readable medium 622 on which is stored one or more sets of data structures or instructions 624 (e.g., software) embodying or utilized by any one or more of the techniques or functions described herein. The instructions 624 may also reside, at least partially, additional machine readable memories such as main memory 604, static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) that configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Figure 7:
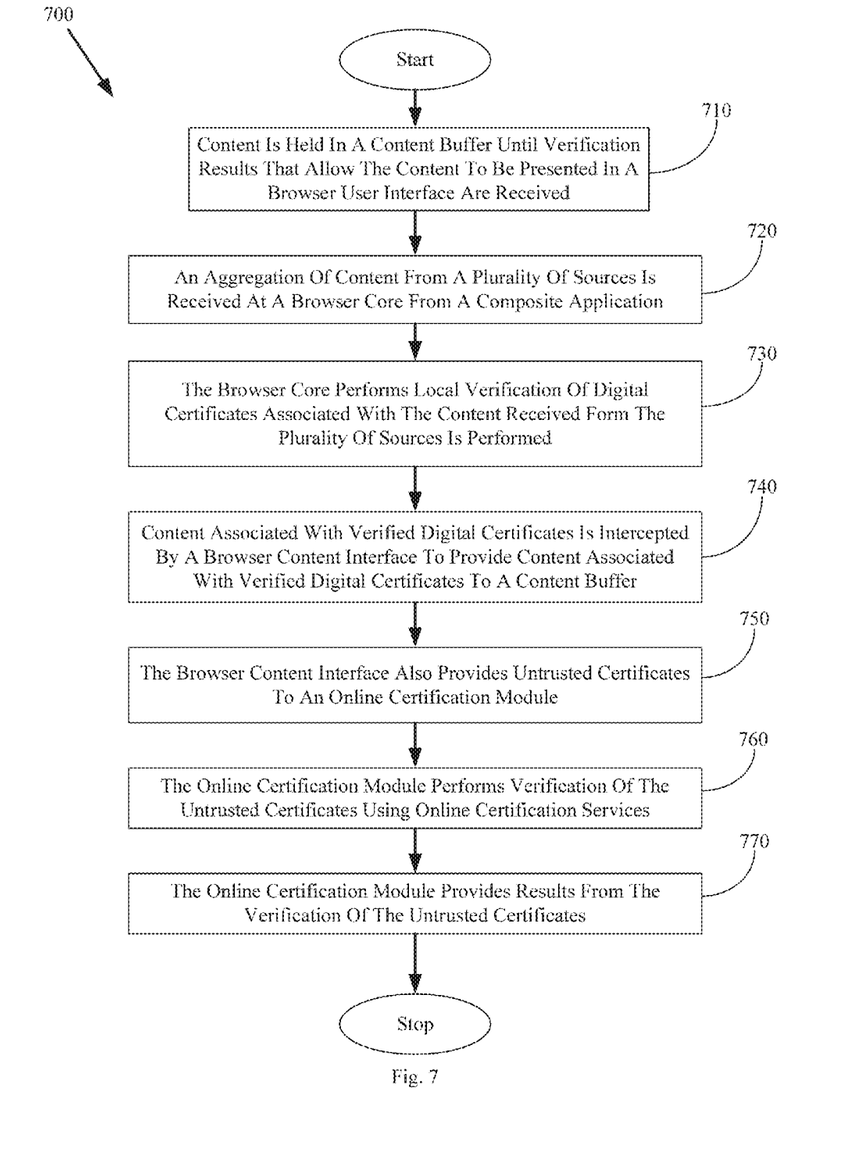
FIG. 7 is a flowchart of a method for providing user transparent certificate verifications for web mashups and other composite applications according to an embodiment.

FIG. 7 is a flowchart 700 of a method for providing user transparent certificate verifications for web mashups and other composite applications according to an embodiment. Content is held in a content buffer until verification results that allow the content to be presented in a browser user interface are received 710. An aggregation of content from a plurality of sources is received at a browser core from a composite application 720. The browser core performs local verification of digital certificates associated with the content received form the plurality of sources is performed 730. Content associated with verified digital certificates is intercepted by a browser content interface to provide content associated with verified digital certificates to a content buffer 740. The browser content interface also provides untrusted certificates to an online certification module 750. The online certification module performs verification of the untrusted certificates using online certification services 760. The online certification module provides verification results from the verification of the untrusted certificates 770.

Additional Notes & Examples

Example 1 includes subject matter (such as a device, apparatus, client or system) for providing transparent certificate verifications for composite applications, including a content buffer for holding content, a browser content interface arranged to intercept an aggregation of content from a plurality of sources, the aggregation of content associated with verified digital certificates and untrusted certificates, to provide content associated with verified digital certificates to the content buffer for holding and an online certification module, coupled to the browser content interface, the online certification module arranged to receive, from the browser content interface, the untrusted certificates associated with the aggregation of content and to perform verification of the received untrusted certificates using online certification services and a local certificate store and providing verification results to the content buffer to allow the aggregation of content verified by the online certificate module to be presented in a browser user interface.

Example 2 may optionally include the subject matter of Example 1 further comprising a browser core for receiving an aggregation of content from a plurality of sources and performing local verification of digital certificates associated with the content received form the plurality of sources, the browser core providing the aggregation of content form the plurality of sources for interception by the browser content interface.

Example 3 may optionally include the subject matter of any one or more of Examples 1 and 2, further comprising a browser user interface, the content buffer determining whether to release or to block content being held to the browser user interface based on the verification results provided by the online certification module.

Example 4 may optionally include the subject matter of any one or more of Examples 1-3, further comprising a composite application for receiving the content from the plurality of sources and aggregating the content to produce the aggregation of content.

Example 5 may optionally include the subject matter of any one or more of Examples 1-4, wherein the online certification module comprises a certificate verification application coupled to the browser content interface to receive the untrusted certificates and a verification aggregation engine arranged to aggregates verification results produced by the certificate verification application.

Example 6 may optionally include the subject matter of any one or more of Examples 1-5, wherein the verification aggregation engine is arranged to send the aggregated verification results to the content buffer, to provide feedback to online verification services based on the verification results produced by analysis of the untrusted certificates by the certificate verification application, and to send updates to the local certificate store based on the verification results.

Example 7 may optionally include the subject matter of any one or more of Examples 1-6, wherein the online certification service comprises a cloud security certificate verification service and an enterprise security certificate verification and policy service, and wherein the local certificate store comprise a local database with historical information with different websites and associated certificate data, along with user policies based on certificate status.

Example 8 may include subject matter (such as a method or means for performing acts) including receiving, at a browser core, an aggregation of content from a plurality of sources, performing, at a browser core, local verification of digital certificates associated with the content received form the plurality of sources, intercepting, by a browser content interface, content associated with verified digital certificates and untrusted certificates from the browser core, to provide content associated with verified digital certificates, holding content, obtained from the browser content interface, in a content buffer until receiving verification results allowing the content to be presented in a browser user interface, receiving, at an online certification module, untrusted certificates received from the browser content interface and performing, by the online certification module, verification of the received untrusted certificates using online certification services and a local certificate store.

Example 9 may optionally be combined with the subject matter of any one or more of Examples 1-8 to further include providing, by the online certification module, verification results obtained from the verification of the received untrusted certificates using online certification services to the content buffer.

Example 10 may optionally be combined with the subject matter of any one or more of Examples 1-9 to further include determining, by the content buffer, whether to release or to block to the browser user interface content being held based on the verification results provided by the online certification module.

Example 11 may optionally be combined with the subject matter of any one or more of Examples 1-10 to further include receiving, at a composite application, the content from the plurality of sources and aggregating the content to produce the aggregation of content provided to the browser core.

Example 12 may optionally be combined with the subject matter of any one or more of Examples 1-11, wherein the receiving untrusted certificates at the online certification module further comprises receiving the untrusted certificates at a certificate verification application coupled to the browser content interface and aggregating verification results produced by the certificate verification application at a verification aggregation engine.

Example 13 may optionally be combined with the subject matter of any one or more of Examples 1-12 to further include sending, by the verification aggregation engine, the aggregated verification results to the content buffer, providing feedback to online verification services based on the verification results produced by analysis of the untrusted certificates by the certificate verification application, and updating the local certificate store based on the verification results.

Example 14 may optionally be combined with the subject matter of any one or more of Examples 1-13, wherein the performing, by the online certification module, verification of the received untrusted certificates using online certification services further comprises sending the untrusted certificates to a cloud security certificate verification service and to an enterprise security certificate verification and policy service to produce the verification results, and wherein the local certificate store comprise a local database with historical information with different websites and associated certificate data, along with user policies based on certificate status.

Example 15 may include subject matter (such as means for performing acts or machine readable medium including instructions that, when executed by the machine, cause the machine to perform acts) including performing, at a browser core, local verification of digital certificates associated with an aggregation of content received form the plurality of sources, intercepting, by a browser content interface, the aggregation of content associated with verified digital certificates and unverified certificates from the browser core, holding the aggregation of content, obtained from the browser content interface, in a content buffer until receiving verification results for the unverified certificates allowing the content to be presented in a browser user interface, receiving, at an online certification module, the untrusted certificates received from the browser content interface, and performing, by the online certification module, verification of the received untrusted certificates using online certification services and a local certificate store.

Example 16 may optionally be combined with the subject matter of any one or more of Examples 1-15 to further include providing, by the online certification module, verification results obtained from the verification of the received untrusted certificates using online certification services to the content buffer.

Example 17 may optionally be combined with the subject matter of any one or more of Examples 1-16 to further include determining, by the content buffer, whether to release or to block to the browser user interface content being held based on the verification results provided by the online certification module.

Example 18 may optionally be combined with the subject matter of any one or more of Examples 1-17 to further include receiving, at a composite application, the content from the plurality of sources and aggregating the content to produce the aggregation of content provided to the browser core.

The above detailed description discloses embodiments of a user transparent and automated solution to verify multiple digital certificates from different sources in web mashups and other composite applications. The embodiments provide the ability to reduce user decision making on whether to allow content from untrusted sources after verifying the certificates with different verification methods (local certificate store, enterprise CA, cloud CA, etc.). The client certificate store may be updated based on the verification results of previously unknown or expired certificates. Additional data points are provided for the enterprise certificate management to better manage certificate status and push updates to enterprise clients. The certification verification modules may be implemented as an independent security application, an add-on the Secure Enclave/McAfee DeepSafe, or a firmware.

The above detailed description includes references to the accompanying drawings, which form apart of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it wilt not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A client for providing transparent certificate verifications for composite applications, comprising:
   a content buffer arranged to hold content from a plurality of content sources arranged to provide content of a plurality of content types;
   a browser core arranged to:
      receive an aggregation of content from a plurality of sources; and
      perform local verification of digital certificates associated with the content received from the plurality of sources;
   a browser content interface coupled to the browser core and arranged to intercept the aggregation of content, the aggregation of content associated with verified digital certificates and untrusted certificates, to provide content associated with verified digital certificates to the content buffer for holding; and
   an online certification circuit, coupled to the browser content interface, the online certification circuit arranged to receive, from the browser content interface, the untrusted certificates associated with the aggregation of content and to perform verification of the received untrusted certificates using an online certification service and a local certificate store and to provide verification results to the content buffer to allow the aggregation of content verified by the online certificate circuit to be presented in a browser user interface,
   wherein the online certification service includes a cloud security certificate verification service and an enterprise security certificate verification and policy service, wherein the cloud security certificate verification service and the enterprise security certificate verification and policy service are arranged to provide policy provisioning and verification services, and
   wherein the online certification circuit provides, to the content buffer, the verification results obtained from the verification of the received untrusted certificates using the online certification service, and wherein the content buffer determines whether to release or to block content being held to the browser user interface based on the verification results provided by the online certification circuit.

2. The client of claim 1, further comprising a composite application for receiving the content from the plurality of sources and aggregating the content to produce the aggregation of content.

3. The client of claim 1, wherein the online certification circuit comprises a certificate verification application coupled to the browser content interface to receive the untrusted certificates and a verification aggregation engine arranged to aggregate verification results produced by the certificate verification application.

4. The client of claim 3, wherein the verification aggregation engine is arranged to send the aggregated verification results to the content buffer, to provide feedback to online verification services based on the verification results produced by analysis of the untrusted certificates by the certificate verification application, and to send updates to the local certificate store based on the verification results.

5. The client of claim 1, wherein the local certificate store comprises a local database with historical information with different websites and associated certificate data, along with user policies based on certificate status.

6. A system for providing transparent certificate verifications for composite applications, comprises:
  a plurality of content sources arranged to provide content of a plurality of content types;
  an online certification service, the online certification service including a cloud security certificate verification service and an enterprise security certificate verification and policy service, the cloud security certificate verification service and the enterprise security certificate verification and policy service arranged to provide policy provisioning and verification services; and
  a client, coupled to the plurality of content sources and the online certification service, the client further comprising:
    a content buffer for holding content until receiving verification results allowing the content to be presented in a browser user interface;
    a browser core for receiving an aggregation of content from a plurality of sources and performing local verification of digital certificates associated with the content received from the plurality of sources;
    a browser content interface, coupled to the browser core, arranged to intercept content associated with verified digital certificates and untrusted certificates from the browser core, to provide content associated with verified digital certificates to the content buffer for holding; and
    an online certification circuit, coupled to the browser content interface, the online certification circuit arranged to receive the untrusted certificates from the browser content interface and to perform verification of the received untrusted certificates using online certification services and a local certificate store,
    wherein the online certification circuit provides, to the content buffer, verification results obtained from the verification of the received untrusted certificates using online certification services, and
  wherein the client further comprises a browser user interface, the content buffer determining whether to release or to block content being held to the browser user interface based on the verification results provided by the online certification circuit.

7. The system of claim 6 further comprising a composite application for receiving the content from the plurality of sources and aggregating the content to produce the aggregation of content provided to the browser core.

8. The system of claim 6, wherein the online certification circuit comprises a certificate verification application coupled to the browser content interface to receive the untrusted certificates and a verification aggregation engine arranged to aggregate verification results produced by the certificate verification application.

9. The system of claim 8, wherein the verification aggregation engine is arranged to send the aggregated verification results to the content buffer, to provide feedback to online verification services based on the verification results produced by analysis of the untrusted certificates by the certificate verification application, and to send updates to a local certificate store based on the verification results.

10. The system of claim 6, wherein the local certificate store comprises a local database with historical information with different websites and associated certificate data, along with user policies based on certificate status.

11. A method for providing transparent certificate verifications for composite applications, comprising:
  performing, at a browser core, local verification of digital certificates associated with an aggregation of content received from a plurality of content sources arranged to provide content of a plurality of content types;
  intercepting, by a browser content interface, the aggregation of content associated with verified digital certificates and unverified certificates from the browser core;
  holding the aggregation of content, obtained from the browser content interface, in a content buffer until receiving verification results for the unverified certificates allowing the content to be presented in a browser user interface;
  receiving, at an online certification circuit, the untrusted certificates received from the browser content interface;
  performing, by the online certification circuit, verification of the received untrusted certificates using an online certification service and a local certificate store, wherein the online certification service includes a cloud security certificate verification service and an enterprise security certificate verification and policy service, wherein the cloud security certificate verification service and the enterprise security certificate verification and policy service are arranged to provide policy provisioning and verification services;
  providing, by the online certification circuit to the content buffer, verification results obtained from the verification of the received untrusted certificates using online certification services; and
  determining, by the content buffer, whether to release or to block content being held to the browser user interface based on the verification results provided by the online certification circuit.

12. The method of claim 11 further comprising receiving, at a composite application, the content from the plurality of sources and aggregating the content to produce the aggregation of content provided to the browser core.

13. The method of claim 11, wherein the receiving untrusted certificates at the online certification circuit further comprises receiving the untrusted certificates at a certificate verification application coupled to the browser content interface and aggregating verification results produced by the certificate verification application at a verification aggregation engine.

14. The method of claim 13 further comprising sending, by the verification aggregation engine, the aggregated verification results to the content buffer, providing feedback to online verification services based on the verification results produced by analysis of the untrusted certificates by the certificate verification application, and updating a local certificate store based on the verification results.

15. The method of claim 13, wherein the performing, by the online certification circuit, verification of the received untrusted certificates using online certification services further comprises sending the untrusted certificates to a cloud security certificate verification service, to an enterprise security certificate verification and policy service, and to the local certificate store to produce the verification results, wherein the local certificate store comprises a local database with historical information with different websites and associated certificate data, along with user policies based on certificate status.

16. At least one machine readable memory comprising instructions that, when executed by the machine, cause the machine to perform operations for providing transparent certificate verifications for composite applications, the operations comprising:

performing, at a browser core, local verification of digital certificates associated with an aggregation of content received from a plurality of content sources arranged to provide content of a plurality of content types;

intercepting, by a browser content interface, the aggregation of content associated with verified digital certificates and unverified certificates from the browser core;

holding the aggregation of content, obtained from the browser content interface, in a content buffer until receiving verification results for the unverified certificates allowing the content to be presented in a browser user interface;

receiving, at an online certification circuit, the untrusted certificates received from the browser content interface;

performing, by the online certification circuit, verification of the received untrusted certificates using an online certification service and a local certificate store, wherein the online certification service includes a cloud security certificate verification service and an enterprise security certificate verification and policy service, wherein the cloud security certificate verification service and the enterprise security certificate verification and policy service are arranged to provide policy provisioning and verification services;

providing, by the online certification circuit to the content buffer, verification results obtained from the verification of the received untrusted certificates using online certification services; and determining, by the content buffer, whether to release or to block content being held to the browser user interface based on the verification results provided by the online certification circuit.

17. The at least one machine readable memory of claim 16 further comprising receiving, at a composite application, the content from the plurality of sources and aggregating the content to produce the aggregation of content provided to the browser core.

* * * * *